United States Patent
Jones et al.

(10) Patent No.: US 7,617,450 B2
(45) Date of Patent: Nov. 10, 2009

(54) METHOD, SYSTEM, AND COMPUTER-READABLE MEDIUM FOR CREATING, INSERTING, AND REUSING DOCUMENT PARTS IN AN ELECTRONIC DOCUMENT

(75) Inventors: Brian M. Jones, Redmond, WA (US); Christopher H. Pratley, Seattle, WA (US); Eric D. Bailey, Redmond, WA (US); Marcin Sawicki, Kirkland, WA (US); Roberto C. Taboada, Duvall, WA (US); Tristan A. Davis, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 254 days.

(21) Appl. No.: 10/955,622

(22) Filed: Sep. 30, 2004

(65) Prior Publication Data
US 2006/0075337 A1    Apr. 6, 2006

(51) Int. Cl.
*G06F 17/00* (2006.01)
(52) U.S. Cl. .................. 715/255; 715/838; 715/841
(58) Field of Classification Search .......... 715/526, 715/527, 529, 522, 530, 539, 540, 248, 271–274, 715/255, 730–731, 838, 841
See application file for complete search history.

(56) References Cited

U.S. PATENT DOCUMENTS

| | | | |
|---|---|---|---|
| 4,410,286 A | 10/1983 | Ko et al. | |
| 4,594,674 A | 6/1986 | Boulia et al. | |
| 4,649,513 A | 3/1987 | Martin et al. | |
| 4,870,611 A | 9/1989 | Martin et al. | |
| 5,222,205 A | 6/1993 | Larson et al. | |
| 5,267,155 A * | 11/1993 | Buchanan et al. | 715/540 |
| 5,469,533 A | 11/1995 | Dennis | |
| 5,487,138 A | 1/1996 | Rust et al. | |
| 5,537,526 A | 7/1996 | Anderson et al. | |
| 5,579,466 A | 11/1996 | Habib et al. | 715/529 |
| 5,579,519 A * | 11/1996 | Pelletier | 717/139 |
| 5,613,124 A | 3/1997 | Atkinson et al. | |
| 5,655,130 A | 8/1997 | Dodge et al. | |

(Continued)

FOREIGN PATENT DOCUMENTS

EP    1 376 387 A2    1/2004

(Continued)

OTHER PUBLICATIONS

ReplyAssistant, 4OfficeAutomation, Inc., Copyright © 2002, pp. 1-9.*

(Continued)

*Primary Examiner*—Doug Hutton
*Assistant Examiner*—James H Blackwell
(74) *Attorney, Agent, or Firm*—Merchant & Gould P.C.

(57) ABSTRACT

A method, system, and computer-readable medium are provided for creating, inserting, and reusing document parts in an electronic document. According to a system, a word processing application program receives a selection of a document part category. In response to the selection of the document part category, a gallery of document parts is displayed in a user interface. A selection of a document part from the gallery is received and inserted in the electronic document without the need for additional formatting. The gallery of document parts defines a page layout for the electronic document. Document parts may be created within the user interface by modifying pre-built document parts.

19 Claims, 8 Drawing Sheets

U.S. PATENT DOCUMENTS

| | | | |
|---|---|---|---|
| 5,675,788 A * | 10/1997 | Husick et al. | 707/104.1 |
| 5,701,342 A | 12/1997 | Anderson et al. | |
| 5,745,910 A | 4/1998 | Piersol et al. | |
| 5,752,055 A | 5/1998 | Redpath et al. | |
| 5,752,056 A | 5/1998 | Celik | |
| 5,819,295 A | 10/1998 | Nakagawa et al. | |
| 5,845,058 A | 12/1998 | Shaw et al. | |
| 5,893,109 A * | 4/1999 | DeRose et al. | 707/104.1 |
| 5,903,903 A | 5/1999 | Kennedy | |
| 5,903,905 A * | 5/1999 | Andersen et al. | 715/526 |
| 5,905,504 A | 5/1999 | Barkans et al. | |
| 5,911,776 A | 6/1999 | Guck | |
| 5,950,215 A | 9/1999 | Tabuchi | |
| 5,960,168 A | 9/1999 | Shaw et al. | |
| 5,993,088 A | 11/1999 | Nogay et al. | |
| 6,023,714 A | 2/2000 | Hill et al. | 715/513 |
| 6,026,416 A | 2/2000 | Kanerva et al. | |
| 6,067,531 A * | 5/2000 | Hoyt et al. | 705/35 |
| 6,094,665 A | 7/2000 | Lyons et al. | |
| 6,134,552 A | 10/2000 | Fritz et al. | |
| 6,144,974 A | 11/2000 | Gartland | |
| 6,175,845 B1 | 1/2001 | Smith et al. | |
| 6,182,080 B1 | 1/2001 | Clements | 707/102 |
| 6,182,096 B1 | 1/2001 | Mastie et al. | |
| 6,199,082 B1 | 3/2001 | Ferrel et al. | |
| 6,212,530 B1 | 4/2001 | Kadlec | |
| 6,247,018 B1 | 6/2001 | Rheaume | |
| 6,247,066 B1 | 6/2001 | Tanaka | |
| 6,269,403 B1 | 7/2001 | Anders et al. | |
| 6,342,904 B1 | 1/2002 | Vasudevan et al. | |
| 6,362,870 B2 | 3/2002 | Mui et al. | |
| 6,393,441 B1 | 5/2002 | Kanerva et al. | |
| 6,407,821 B1 | 6/2002 | Hohensee et al. | |
| 6,418,448 B1 | 7/2002 | Sarkar | |
| 6,449,653 B2 | 9/2002 | Klemets et al. | |
| 6,457,017 B2 | 9/2002 | Watkins et al. | |
| 6,480,206 B2 | 11/2002 | Prinzing | |
| 6,484,189 B1 | 11/2002 | Gerlach et al. | |
| 6,496,206 B1 | 12/2002 | Mernyk et al. | 715/835 |
| 6,507,858 B1 | 1/2003 | Kanerva et al. | |
| 6,509,974 B1 | 1/2003 | Hansen | |
| 6,538,760 B1 | 3/2003 | deBry et al. | |
| 6,549,918 B1 | 4/2003 | Probert, Jr. et al. | |
| 6,583,789 B1 | 6/2003 | Carlson et al. | |
| 6,591,278 B1 | 7/2003 | Ernst | |
| 6,604,144 B1 | 8/2003 | Anders | |
| 6,608,693 B1 | 8/2003 | Loyd et al. | |
| 6,609,200 B2 | 8/2003 | Anderson et al. | |
| 6,654,737 B1 | 11/2003 | Nunez | |
| 6,657,647 B1 | 12/2003 | Bright | |
| 6,658,477 B1 | 12/2003 | Lisitsa et al. | |
| 6,674,540 B1 | 1/2004 | Wiechers et al. | |
| 6,675,353 B1 | 1/2004 | Friedman | |
| 6,675,356 B1 | 1/2004 | Adler et al. | |
| 6,681,223 B1 | 1/2004 | Sundaresan | |
| 6,694,485 B1 | 2/2004 | Kelley et al. | |
| 6,715,126 B1 | 3/2004 | Chang et al. | |
| 6,763,343 B1 | 7/2004 | Brooke et al. | |
| 6,771,291 B1 | 8/2004 | DiStefano, III | |
| 6,781,609 B1 | 8/2004 | Barker et al. | |
| 6,785,673 B1 | 8/2004 | Fernandez | |
| 6,789,229 B1 | 9/2004 | Dunietz et al. | |
| 6,812,941 B1 | 11/2004 | Brown et al. | |
| 6,871,321 B2 | 3/2005 | Wakayama | |
| 6,910,843 B2 | 6/2005 | Saw et al. | |
| 6,912,555 B2 | 6/2005 | Lemon et al. | 715/513 |
| 6,918,082 B1 | 7/2005 | Gross et al. | |
| 6,925,597 B2 | 8/2005 | Anwar | |
| 6,925,631 B2 | 8/2005 | Golden | |
| 6,931,590 B2 | 8/2005 | Kanie et al. | |
| 6,938,203 B1 | 8/2005 | Dimarco et al. | |
| 6,941,510 B1 | 9/2005 | Ozzie et al. | |
| 6,952,801 B2 | 10/2005 | Warmus et al. | |
| 6,961,902 B2 * | 11/2005 | Anecki et al. | 715/530 |
| 6,981,207 B1 * | 12/2005 | Bakman et al. | 715/500 |
| 6,993,527 B1 | 1/2006 | Raman et al. | |
| 7,036,076 B2 | 4/2006 | Anwar | |
| 7,051,276 B1 | 5/2006 | Mogilevsky et al. | |
| 7,054,841 B1 | 5/2006 | Tenorio | 705/57 |
| 7,080,083 B2 | 7/2006 | Kim et al. | 707/100 |
| 7,134,071 B2 | 11/2006 | Ohwada et al. | |
| 7,168,035 B1 | 1/2007 | Bell et al. | |
| 7,171,618 B2 | 1/2007 | Harrington et al. | |
| 7,290,205 B2 | 10/2007 | Monocsko et al. | |
| 7,301,544 B2 | 11/2007 | Yuan | |
| 7,412,649 B2 | 8/2008 | Emek et al. | |
| 7,418,652 B2 | 8/2008 | Ornstein et al. | |
| 7,487,448 B2 | 2/2009 | Emerson et al. | |
| 7,549,118 B2 | 6/2009 | Shur et al. | |
| 2001/0003828 A1 | 6/2001 | Peterson et al. | |
| 2001/0013043 A1 | 8/2001 | Wagner | |
| 2001/0016842 A1 | 8/2001 | Umen et al. | |
| 2001/0018697 A1 | 8/2001 | Kunitake et al. | |
| 2001/0034739 A1 * | 10/2001 | Anecki et al. | 707/500 |
| 2001/0039552 A1 | 11/2001 | Killi et al. | |
| 2001/0044809 A1 | 11/2001 | Parasnis et al. | |
| 2001/0044813 A1 | 11/2001 | Frank | |
| 2001/0051962 A1 | 12/2001 | Piotkin | |
| 2001/0054042 A1 | 12/2001 | Watkins et al. | |
| 2002/0004805 A1 | 1/2002 | Nojima et al. | |
| 2002/0016800 A1 | 2/2002 | Spivak et al. | |
| 2002/0038348 A1 | 3/2002 | Malone et al. | |
| 2002/0049790 A1 | 4/2002 | Ricker et al. | |
| 2002/0059265 A1 | 5/2002 | Valorose | |
| 2002/0059337 A1 | 5/2002 | Takaoka et al. | |
| 2002/0065848 A1 | 5/2002 | Walker et al. | 707/511 |
| 2002/0065857 A1 | 5/2002 | Michalewicz | |
| 2002/0073236 A1 | 6/2002 | Helgeson et al. | |
| 2002/0087602 A1 | 7/2002 | Masuda et al. | |
| 2002/0099797 A1 | 7/2002 | Merrell et al. | |
| 2002/0103835 A1 | 8/2002 | Kearney | |
| 2002/0107886 A1 | 8/2002 | Gentner et al. | |
| 2002/0111133 A1 | 8/2002 | Wittkotter | |
| 2002/0116421 A1 | 8/2002 | Fox et al. | |
| 2002/0120647 A1 | 8/2002 | Amano | |
| 2002/0129058 A1 | 9/2002 | Story et al. | |
| 2002/0174145 A1 | 11/2002 | Duga et al. | |
| 2002/0184263 A1 | 12/2002 | Perinet et al. | |
| 2002/0188638 A1 | 12/2002 | Hamscher | |
| 2002/0194220 A1 | 12/2002 | Sluiman | |
| 2003/0004957 A1 | 1/2003 | Broman et al. | |
| 2003/0023637 A1 | 1/2003 | Halahmi | 707/523 |
| 2003/0028560 A1 | 2/2003 | Kudrolli et al. | |
| 2003/0033287 A1 | 2/2003 | Shanahan et al. | |
| 2003/0065946 A1 * | 4/2003 | Holliday | 713/201 |
| 2003/0074633 A1 * | 4/2003 | Boulmakoul et al. | 715/506 |
| 2003/0079181 A1 | 4/2003 | Schumacher et al. | |
| 2003/0093520 A1 | 5/2003 | Beesley | |
| 2003/0115547 A1 | 6/2003 | Ohwada et al. | |
| 2003/0120671 A1 | 6/2003 | Kim et al. | 707/100 |
| 2003/0126136 A1 | 7/2003 | Omoigui | |
| 2003/0126260 A1 | 7/2003 | Husain et al. | |
| 2003/0137359 A1 | 7/2003 | Dees | |
| 2003/0137691 A1 * | 7/2003 | Tanaka | 358/1.15 |
| 2003/0142128 A1 * | 7/2003 | Reulein et al. | 345/742 |
| 2003/0145134 A1 | 7/2003 | Wehage et al. | |
| 2003/0149934 A1 | 8/2003 | Worden | 715/513 |
| 2003/0149935 A1 | 8/2003 | Takizawa et al. | 715/513 |
| 2003/0158851 A1 | 8/2003 | Britton et al. | |
| 2003/0163552 A1 | 8/2003 | Savitzky et al. | |
| 2003/0167446 A1 | 9/2003 | Thomas | 715/513 |
| 2003/0172105 A1 | 9/2003 | Mak et al. | |
| 2003/0172343 A1 * | 9/2003 | Leymaster et al. | 715/500 |
| 2003/0177446 A1 | 9/2003 | Gropper et al. | 715/522 |

| | | | | | | |
|---|---|---|---|---|---|---|
| 2003/0177449 A1 | 9/2003 | Rose ........................ 715/530 | | 2005/0144556 A1 | 6/2005 | Petersen et al. |
| 2003/0182450 A1 | 9/2003 | Ong et al. | | 2005/0149861 A1 | 7/2005 | Bishop et al. ............... 715/515 |
| 2003/0182656 A1 | 9/2003 | Leathers et al. | | 2005/0177784 A1 | 8/2005 | Andrews et al. |
| 2003/0195784 A1 | 10/2003 | Smith | | 2005/0192813 A1 | 9/2005 | Richard |
| 2003/0196176 A1* | 10/2003 | Abu-Ghazalah et al. .... 715/530 | | 2005/0198561 A1 | 9/2005 | McAuley |
| 2003/0221167 A1 | 11/2003 | Goldstein et al. ........... 715/513 | | 2005/0204016 A1 | 9/2005 | McAuley |
| 2003/0222890 A1 | 12/2003 | Salesin et al. | | 2005/0210026 A1 | 9/2005 | Wood |
| 2003/0229845 A1 | 12/2003 | Salesin et al. | | 2005/0223312 A1 | 10/2005 | Erdtmann et al. |
| 2003/0233420 A1 | 12/2003 | Stark et al. | | 2005/0246724 A1 | 11/2005 | Foehr et al. |
| 2003/0237048 A1 | 12/2003 | Jones et al. | | 2005/0248790 A1 | 11/2005 | Ornstein et al. |
| 2003/0237049 A1 | 12/2003 | Sawicki et al. | | 2005/0249536 A1 | 11/2005 | Sedky et al. |
| 2004/0002937 A1 | 1/2004 | Jones et al. ..................... 707/1 | | 2005/0251739 A1 | 11/2005 | Shur et al. |
| 2004/0003342 A1 | 1/2004 | Liao et al. ................. 715/501.1 | | 2005/0251740 A1 | 11/2005 | Shur et al. |
| 2004/0003388 A1 | 1/2004 | Jacquemot et al. | | 2005/0251742 A1 | 11/2005 | Mogilevsky et al. |
| 2004/0003389 A1 | 1/2004 | Reynar et al. ............... 717/178 | | 2005/0268221 A1 | 12/2005 | Shur et al. |
| 2004/0015782 A1 | 1/2004 | Day et al. | | 2005/0278616 A1 | 12/2005 | Eller |
| 2004/0015890 A1 | 1/2004 | Wong et al. | | 2005/0278626 A1 | 12/2005 | Malik |
| 2004/0015908 A1* | 1/2004 | Giel et al. .................... 717/141 | | 2006/0010371 A1 | 1/2006 | Shur et al. |
| 2004/0019853 A1 | 1/2004 | Takizawa et al. ............ 715/523 | | 2006/0025091 A1* | 2/2006 | Buford ..................... 455/154.2 |
| 2004/0030711 A1 | 2/2004 | Roudot | | 2006/0026585 A1 | 2/2006 | Haselden et al. |
| 2004/0030987 A1* | 2/2004 | Manelli ....................... 715/500 | | 2006/0031749 A1 | 2/2006 | Schramm et al. |
| 2004/0034848 A1 | 2/2004 | Moore et al. | | 2006/0031758 A1 | 2/2006 | Shur et al. |
| 2004/0049737 A1 | 3/2004 | Simon et al. | | 2006/0041838 A1 | 2/2006 | Khan |
| 2004/0054669 A1 | 3/2004 | Seyrat et al. | | 2006/0047743 A1 | 3/2006 | Yuan et al. |
| 2004/0054697 A1 | 3/2004 | Brandenberger | | 2006/0056334 A1 | 3/2006 | Yuan et al. |
| 2004/0066527 A1 | 4/2004 | Kloosterman et al. | | 2006/0069983 A1 | 3/2006 | Bailey et al. ............. 715/501.1 |
| 2004/0078755 A1 | 4/2004 | Shinjo et al. | | 2006/0080314 A1 | 4/2006 | Hubert et al. |
| 2004/0088332 A1 | 5/2004 | Lee et al. | | 2006/0080316 A1 | 4/2006 | Gilmore et al. |
| 2004/0103073 A1 | 5/2004 | Blake et al. | | 2006/0080603 A1 | 4/2006 | Bailey et al. ................ 715/530 |
| 2004/0117733 A1 | 6/2004 | Moreau et al. | | 2006/0095834 A1 | 5/2006 | Jeon et al. |
| 2004/0128535 A1 | 7/2004 | Cheng | | 2006/0117019 A1 | 6/2006 | Sylthe et al. |
| 2004/0128623 A1 | 7/2004 | Hudson ....................... 715/530 | | 2006/0136433 A1 | 6/2006 | Rothschiller et al. ......... 707/100 |
| 2004/0139049 A1 | 7/2004 | Hancock et al. | | 2006/0136477 A1 | 6/2006 | Bishop et al. ............... 707/102 |
| 2004/0148278 A1 | 7/2004 | Milo et al. | | 2006/0136553 A1 | 6/2006 | Villaron et al. .............. 709/203 |
| 2004/0148567 A1 | 7/2004 | Jeon et al. | | 2006/0136809 A1 | 6/2006 | Fernstrom .................... 715/505 |
| 2004/0153467 A1 | 8/2004 | Conover et al. | | 2006/0136812 A1 | 6/2006 | Jones et al. .................. 715/511 |
| 2004/0172584 A1 | 9/2004 | Jones et al. | | 2006/0136816 A1 | 6/2006 | Jones et al. .................. 715/517 |
| 2004/0172592 A1 | 9/2004 | Collie et al. | | 2006/0136827 A1 | 6/2006 | Villaron et al. .............. 715/730 |
| 2004/0181753 A1 | 9/2004 | Michaelides | | 2006/0155529 A1 | 7/2006 | Ludviksson et al. |
| 2004/0183837 A1 | 9/2004 | Watanabe et al. | | 2006/0168562 A1 | 7/2006 | Emek et al. |
| 2004/0194025 A1 | 9/2004 | Hubert et al. | | 2006/0190815 A1 | 8/2006 | Jones et al. .................. 715/515 |
| 2004/0205470 A1 | 10/2004 | Jones et al. .................. 715/500 | | 2006/0206794 A1 | 9/2006 | Ornstein et al. |
| 2004/0205533 A1* | 10/2004 | Lopata et al. ............... 715/507 | | 2006/0227150 A1 | 10/2006 | Yuan |
| 2004/0205539 A1 | 10/2004 | Mak et al. | | 2006/0259854 A1 | 11/2006 | Walker et al. ............. 715/501.1 |
| 2004/0205580 A1 | 10/2004 | De Angelis et al. | | 2006/0271574 A1 | 11/2006 | Villaron et al. .............. 707/100 |
| 2004/0205623 A1 | 10/2004 | Weil et al. | | 2006/0277452 A1 | 12/2006 | Villaron et al. .............. 715/500 |
| 2004/0205653 A1 | 10/2004 | Hadfield et al. | | 2007/0022128 A1 | 1/2007 | Rothschiller et al. ......... 707/100 |
| 2004/0205656 A1* | 10/2004 | Reulein et al. ............... 715/530 | | 2007/0061384 A1 | 3/2007 | Harrington et al. |
| 2004/0210818 A1 | 10/2004 | Jones et al. .................. 715/500 | | 2007/0136443 A1 | 6/2007 | Sah et al. |
| 2004/0216048 A1 | 10/2004 | Brown et al. | | | | |
| 2004/0221233 A1 | 11/2004 | Thielen | | | | |

FOREIGN PATENT DOCUMENTS

| | | |
|---|---|---|
| EP | 1 452 966 | 11/2004 |
| EP | 1 672 543 | 11/2005 |
| EP | 1 672 528 | 12/2005 |
| WO | WO 99/01802 A2 | 1/1999 |
| WO | WO 01/44932 A1 | 6/2001 |
| WO | WO 01/80044 A2 | 10/2001 |
| WO | WO 02/21339 A2 | 3/2002 |
| WO | WO 03/009517 A2 | 1/2003 |
| WO | WO 03/021537 A1 | 3/2003 |
| WO | WO 2006/133053 | 12/2006 |
| ZA | 2005/09350 | 4/2008 |

| | | | |
|---|---|---|---|
| 2004/0226012 A1* | 11/2004 | Awada et al. ................ 718/100 |
| 2004/0230894 A1 | 11/2004 | Elza et al. |
| 2004/0243551 A1* | 12/2004 | Boone et al. ..................... 707/3 |
| 2004/0267553 A1 | 12/2004 | Brunton |
| 2004/0268304 A1 | 12/2004 | Kuo et al. |
| 2005/0005233 A1 | 1/2005 | Kays et al. |
| 2005/0022113 A1 | 1/2005 | Hanlon |
| 2005/0063010 A1 | 3/2005 | Giannetti |
| 2005/0066335 A1 | 3/2005 | Aarts ........................ 719/316 |
| 2005/0071385 A1 | 3/2005 | Rao |
| 2005/0071755 A1 | 3/2005 | Harrington et al. |
| 2005/0091574 A1 | 4/2005 | Maaniitty et al. |
| 2005/0091575 A1 | 4/2005 | Relyea et al. |
| 2005/0099398 A1 | 5/2005 | Garside et al. |
| 2005/0105116 A1 | 5/2005 | Kobashi |
| 2005/0108001 A1 | 5/2005 | Aarskog |
| 2005/0108212 A1 | 5/2005 | Karimisetty et al. ........... 707/3 |
| 2005/0108278 A1 | 5/2005 | Jones et al. |
| 2005/0120061 A1 | 6/2005 | Kraft |
| 2005/0125720 A1 | 6/2005 | Little et al. |
| 2005/0125728 A1 | 6/2005 | Peiro et al. |
| 2005/0132279 A1 | 6/2005 | Relyea et al. |

OTHER PUBLICATIONS

Unknown, ReplyAssistant Version 1.1, downloaded from <"http://www.goldmedalsoft.com/shareware/Business_Finance-Miscellaneous-ReplyAssistant-1.1.html">, Copyright 2000-2001, 7 figures, 5 pages ReadMe, 1 page About ReplyAssistant, 13 pages total.*

U.S. Appl. No. 10/726,077, filed Dec. 2003, Jones et al.

U.S. Appl. No. 10/731,900, filed Dec. 2003, Jones et al.

Brauer M. et al., "Open Office Specification 1.0," Online Publication, Mar. 22, 2004, XP002404030; Retrieved from the Internet:

URL:http://www.oasis-open.org/committees/download.php/6037/office-spec-1.0-cd-1.pdf on Oct. 20, 2006, 607 pp.
Anonymous: "Technical note TN2073: Deconstructing A Keynote 1.x Document: Part One—Slides," Online Publication, May 20, 2003, XP002404031, Retrieved from the Internet: URL:http:///developer.apple.com/technotes/tn2002/pdf/tn2073.pdf on Oct. 20, 2006, 27 pp.
Anonymous: "Technical Note 2067: About the Keynote XML File Format (APXL Schema)," Online Publication, Feb. 12, 2003, XP002404032; Retrieved from the Internet: URL:http://developer.apple.com/technotes/tn2002/pdf/tn2067.pdf on Oct. 20, 2006, 26 pp.
Anonymous: "Mulberry Slideshow XML (v 2.1): A User's Guide," Online Publication, Dec. 7, 2001, XP002404033; Retrieved from the Internet: URL:http://www.mulberrytech.com/slideshow/Mulberry-slideshow.zip on Oct. 20, 2006, 17 pp.
European Search Report dated Nov. 3, 2006 in Application No. 05111509.5.
U.S. Appl. No. 10/731,900, filed Dec. 9, 2003 entitled "Context Free Document Portions".
U.S. Official Action mailed May 12, 2006 in U.S. Appl. No. 10/731,900.
U.S. Official Action mailed Feb. 21, 2007 in U.S. Appl. No. 11/018,569.
U.S. Official Action mailed Feb. 28, 2007 in U.S. Appl. No. 10/731,900.
U.S. Official Action mailed Mar. 7, 2007 in U.S. Appl. No. 11/018,912.
U.S. Official Action mailed Mar. 21, 2007 in U.S. Appl. No. 11/018,910.
U.S. Official Action mailed Mar. 21, 2007 in U.S. Appl. No. 11/019,088.
U.S. Official Action mailed May 8, 2007 in U.S. Appl. No. 11/072,188.
U.S. Official Action mailed Jun. 18, 2007 in U.S. Appl. No. 11/398,339.
U.S. Official Action mailed Jun. 19, 2007 in U.S. Appl. No. 11/018,718.
Meyer, O. "a Tool—Creating Validated XML Documents on the Fly Using MS Word", Oct. 2002, pp. 113-121.
Microsoft Word, copyright 2001, 5 pgs.
OpenOffice.org, "OpenOffice.org User Guide for Version 1.1.x: Chapter 4: Spreadsheets in Calc", published May 7, 2004, pp. 1, 2, 179-254, http://documentation.openoffice.org/manuals/OOo1.x.x/user_guide.pdf.
OpenOffice.org, "OpenOffice.org User Guide for Version 1.1.x: Chapter 5: Creating Presentations With Impress", published May 7, 2004, pp. 1, 2, 255-286, http://documentation.openoffice.org/manuals/OOo1.x.x/user_guide.pdf.
ReplyAssistant, copyright 2001, pp. 1-34.
Whitmer, R., "Document Object Model (DOM) Level 3 Xpath Specification", W3C, URL:http://www.w3.org/TR/DOM-Level-3-XPath/, Feb. 26, 2004, Version 1.0, 18 pp.
"@try inCSS3 (was: Useragent Rules in CSS)", http://lists.w3.org/Archives/Public/www-style/2004Mar/0333.html, 2 pages (Mar. 31, 2004).
"Apache Server Frequently Asked Questions", Apache HTTP Server Version 1.3, http://httpd.apache.org/docs/1.3/misc/FAQ.html; 43 pages.
"Controlling the Data Chaos by Adding Intelligence to Media", 4 pages (2004).
"Networked File System", http://www.scit.wlv.ac.uk/~jphb/comms/nfs.htm; 7 pages.
"Open eBook Publication Structure 1.2", http://www.idpf.org/oebps/oebps1.2/download/oeb12-xhtml.htm, 71 pages (Aug. 27, 2002).
Bleuthman et al., "Interleaved Graphics and Text", IBM Technical Disclosure Bulletin, vol. 22, No. 11, pp. 4813-4815 (Apr. 1980).
Chien et al., "Efficient Schemes for Managing Multiversion XML Documents", The VLDB Journal, vol. 11, pp. 332-353 (2002).
Christodoulakis et al., "Multimedia Document Presentation, Information, Extraction, and Document Formation in MINOS: A Model and a System", ACM Transactions on Office Information Systems, vol. 4, No. 4, pp. 345-383 (Oct. 1986).

El-Kwae et al., "Document Image Representation Using XML Technologies", Proceedings of SPIE, vol. 4670, pp. 109-120 (2002).
Ellis, "Postscrip, Bezier Curves and Chinese Characters", ACM, pp. 162-165 (1989).
Girardot et al., "Efficient Representation and Streaming of XML Content Over the Internet Medium", IEEE, pp. 67-70 (2000).
Han et al., "WebSplitter: A Unified XML Framework for Multi-Device Collaborative Web Browsing", ACM, pp. 221-230 (2000).
Hardy et al., "Mapping and Displaying Structural Transformations Between XML and PDF", ACM 2002, pp. 95-102 (2002).
Holman, "What is XSL-FO", Google Mar. 20, 2002, http://www.xml.com/pub/a/2002/03/20/xsl-fo.html, 18 pages.
Jacobs et al., "Adaptive Grid-Based Document Layout", ACM Transactions on Graphics, vol. 22, No. 2, pp. 838-847 (Jul. 2003).
Marco et al., "A Framework for Designing and Implementing the Ada Standard Container Library", ACM, pp. 49-61 (2003).
Miller, "An Introduction to the Resource Decription Framework", D-Lib Magazine, ISSN 1082-9873, http://www.dlib.org/dlib/may98/miller/05miller.html, 10 pages (May 1998).
Obasanjo, "Designing Extensible, Versionable XML Formats", Google Jul. 21, 2004, http://www.xml.com/pub/a/2004/07/21/design.html, 17 pages
Obasanjo, "Designing XML Formats: Versioning vs. Extensibility", Google 2004, blogs.msdn.com/dareobasanjo/archive/2004/04/11/111369,aspx. One additional page is included to show the actual date of the article which is Nov. 17, 2004, 24 pages.
Obasanjo, Designing XML Formats: Versioning vs. Extensibility, Google Apr. 11, 2004, blogs.msdn.com/dareobasanjo/archive/2004/04/11/111369.aspx, 3 pages.
Office Action Correspondence Subsystem, version 1.3 (herein after OACS), copyright Feb. 2003, pp. 1-2 to 1-123, 2-2 to 2-122 and 3-2 to 3-44).
Orchard, "Versioning XML Vocabularies", published on XML.com Dec. 3, 2003, http://web.archive.org/web/20031206005000/www.xml.com/pub/a/2003/12/03/versioning.html (This item is from the Internet Archive of xml.com dated Dec. 12, 2003), 12 pages.
Pawson, "Printing from XML: An Introduction to XSL-FO,", Google Oct. 9, 2002, http://www.xml.com/pub/a/2002/10/09/xslfo.html, 6 pages.
Peters et al., "CrystalWeb—A Distributed Authoring Environment for the World-Wide Web," Computer Networks and ISDN Systems, vol. 27, No. 6, pp. 861-870 (Apr. 1995).
Sahuguet et al., "Building Intelligent Web Applications Using Lightweight Wrappers", Data and Knowledge Engineering, vol. 36, pp. 283-316 (2001).
StarOffice 7 Office Suite, A Sun ONE Software Offering, Basic Programmer's Guide, pp. 1-10, 47, 91, 104 (Jul. 2003).
Steele, "Easy Microsoft Office Word 2003", published Sep. 19, 2003, Que Corporation, pp. 52, 53 and 216 (6 total pages).
van Leeuwen et al., "XML for Flexibility and Extensibility of Design Information Models", Proceedings of CAADRIA, University of Sydney, Australia, pp. 491-502 (2001).
U.S. Official Action mailed Aug. 9, 2007 in U.S. Appl. No. 10/731,900.
U.S. Official Action mailed Sep. 20, 2005 in U.S. Appl. No. 10/836,326.
U.S. Official Action mailed May 31, 2006 in U.S. Appl. No. 10/836,326.
U.S. Official Action mailed Oct. 20, 2006 in U.S. Appl. No. 10/836,326.
U.S. Official Action mailed Apr. 9, 2007 in U.S. Appl. No. 10/836,326.
U.S. Official Action mailed Jul. 26, 2007 in U.S. Appl. No. 10/836,326.
U.S. Official Action mailed Feb. 22, 2008 in U.S. Appl. No. 10/836,327.
U.S. Official Action mailed Jun. 28, 2006 in U.S. Appl. No. 10/836,608.
U.S. Official Action mailed Dec. 12, 2006 in U.S. Appl. No. 10/836,608.
U.S. Official Action mailed Mar. 8, 2007 in U.S. Appl. No. 10/836,608.

U.S. Official Action mailed Jul. 27, 2007 in U.S. Appl. No. 10/836,608.
U.S. Official Action mailed Jan. 24, 2005 in U.S. Appl. No. 10/837,040.
U.S. Official Action mailed Jul. 15, 2005 in U.S. Appl. No. 10/837,040.
U.S. Official Action mailed Oct. 18, 2005 in U.S. Appl. No. 10/837,040.
U.S. Official Action mailed Apr. 6, 2006 in U.S. Appl. No. 10/837,040.
U.S. Official Action mailed Sep. 29, 2006 in U.S. Appl. No. 10/837,040.
U.S. Official Action mailed Dec. 19, 2006 in U.S. Appl. No. 10/837,040.
U.S. Official Action mailed May 15, 2007 in U.S. Appl. No. 10/837,040.
U.S. Official Action mailed Aug. 2, 2007 in U.S. Appl. No. 11/018,405.
U.S. Official Action mailed Jul. 26, 2007 in U.S. Appl. No. 11/018,569.
U.S. Official Action mailed Mar. 18, 2008 in U.S. Appl. No. 11/018,569.
U.S. Official Action mailed Oct. 3, 2007 in U.S. Appl. No. 11/018,910.
U.S. Official Action mailed Oct. 1, 2007 in U.S. Appl. No. 11/018,912.
U.S. Official Action mailed Dec. 28, 2007 in U.S. Appl. No. 11/072,188.
U.S. Official Action mailed Sep. 17, 2007 in U.S. Appl. No. 11/072,659.
U.S. Official Action mailed Feb. 4, 2008 in U.S. Appl. No. 11/125,907.
U.S. Official Action mailed Aug. 29, 2006 in U.S. Appl. No. 11/222,344.
U.S. Official Action mailed Feb. 22, 2007 in U.S. Appl. No. 11/222,344.
U.S. Official Action mailed Aug. 1, 2007 in U.S. Appl. No. 11/222,344.
U.S. Official Action mailed Oct. 3, 2006 in U.S. Appl. No. 11/222,442.
U.S. Official Action mailed Feb. 20, 2007 in U.S. Appl. No. 11/222,442.
U.S. Official Action mailed Jul. 10, 2007 in U.S. Appl. No. 11/222,442.
U.S. Official Action mailed Mar. 25, 2008 in U.S. Appl. No. 11/398,339.
European Search Report dated Dec. 19, 2007 in EP 05111677.0.
European Search Report dated Dec. 19, 2007 in EP 05111375.1.
European Search Report dated Dec. 19, 2007 in EP 05112123.4.
European Examination Report dated Mar. 3, 2008 in EP 05111375.1.
Halvorson et al., "Microsoft Office XP Inside Out, 2001", Microsoft Press, pp. 272, 273 and 289.
"Introduction to SpreadsheetML", Online Helpfile 'OFFICEXMLSDK.CHM' extracted from 'OFFICE2003XMLSCHEMA.EXE', Dec. 5, 2003 http://www.microsoft.com/downloads/details.aspx?familyid=fe118952-3547-420a-a412-00a2662442d9&displaying=en, retrieved on Apr. 10, 2008, 58 pp.
"Comparative Assessment of Open Documents Formats Market Overview - Valoris", 2003, http://europa.eu/int/idabc/en/document/3439, retrieved on Apr. 10, 2008, 40 pp.
"Microsoft Announces Availability of Open and Royalty-Free License for Office 2003 XML Reference Schemas", Nov. 7, 2003, http://www.microsoft.com/presspass/press/2003/nov3/11-17XMLRefSchemaEMEAPR.mspx, retrieved on Apr. 10, 2008, 2 pp.
U.S. Official Action mailed May 14, 2008 in U.S. Appl. No. 10/731,900, 11 pgs.
U.S. Official Action mailed Jun. 26, 2008 in U.S. Appl. No. 11/072,659 , 12 pgs.
U.S. Official Action mailed Jul. 9, 2008 in U.S. Appl. No.11/019,088 , 31 pgs.
U.S. Official Action mailed Oct. 30, 2008 in U.S. Appl. No. 11/125,907, 18 pgs.
European Search Report dated Apr. 22, 2008 in EP 05111549.01, 11 pgs.
PCT Search Report dated Jun. 25, 2008 in PCT/US2006/21673, 10 pgs.
European Communication dated Jul. 22, 2008 in EP 05111549.01, 8 pgs.
European Examination Report dated Mar. 26, 2008 in EP 05111677.1, 19 pgs.
Chinese Office Action dated Aug. 1, 2008 in 200510126792.08, 20 pgs.
Chinese Office Action dated Aug. 1, 2008 in 200510126798.05, 26 pgs.
U.S. Official Action mailed Jul. 22, 2008 in U.S. Appl. No. 11/072,188, 26 pgs.
U.S. Official Action mailed Nov. 14, 2008 in U.S. Appl. No. 11/072,659, 29 pgs.
European Search Report dated Nov. 30, 2007 in EP 05105111.8, 3 pgs.
European Examination Report dated Mar. 14, 2008 in EP 05105111.8, 5 pgs.
Chinese Office Action dated Jul. 18, 2008 in 200510126789.6, 31 pgs.
Chinese Office Action dated Aug. 22, 2008 in 200510125059.04, 28 pgs.
Chinese Office Action dated Oct. 31, 2008 in 200510125058.X, 15 pgs.
European Search Report dated Dec. 15, 2008 in EP 05111511.1, 7 pgs.
Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.
U.S. Official Action mailed Jan. 23, 2009 in U.S. Appl. No.11/389,367.
European Communication dated Mar. 12, 2009 in EP 05111375.1.
U.S. Official Action mailed Dec. 17, 2008 in U.S. Appl. No. 11/019,088.
U.S. Official Action mailed Feb. 4, 2009 in U.S. Appl. No. 11/445,903.
Chinese Office Action dated Jan. 9, 2009 in 200510127115.08.
Chinese Second Office Action dated Jan. 16, 2009 in 200510125062.6.
Chinese Office Action dated Feb. 6, 2009 in 200510126789.6.
Stop Typing the Same Thing, Website Documentation and Screendumps, 4Office Automation Inc., http://web.archive.org/web/20020418015130, http://www.4officeautomation.com/ReplyAssistant, copyright 2002, 4 pp. from download software.
Jones, B., "Word XML's Context Free Chunks: Building a Document from Multiple Pieces of Content", http://blogs.msdn.com/brian jones_archive/2005/07/20/441167.aspx, Jul. 20, 2005, 4 pp.
Carrano, "Data Abstraction and Problem Solving with C++", copyright 1995, pp. 14-16.
U.S. Official Action mailed Apr. 16, 2009 in U.S. Appl. No. 11/072,188.
PCT Search Report dated Jul. 3, 2007 in PCT/US2006/21825.
European Communication dated Mar. 26, 2008 in EP 05112123.4.
Chinese Office Action dated Aug. 1, 2008 in 200510125062.6.
Chinese First Office Action dated Feb. 6, 2009 in 200510088462.4.
Chinese Second Office Action dated Mar. 6, 2009 in 200510126798.5.
European Search Report dated Mar. 11, 2009 in EP 05111550.9.
Adobe Creative Team, "Adobe Acrobat 5.0 Classroom in a Book", published Jun. 26, 2001, Adobe Press, pp. 1-26+cover page (27 pp.).
Russian Official Action dated Jan. 13, 2008 in 2412-139543RU/8132, pp. 1-9.
Chinese Second Office Action dated Mar. 13, 2009 in 200480001395.1, pp. 1-7.
Chinese Second Office Action dated Mar. 27, 2009 in 20040001339.08, pp. 1-7.
Chinese Decision on Rejection dated Mar. 27, 2009 in 200480001336.4, pp. 1-17.

Chinese Decision on Rejection dated May 8, 2009 in 200510125059.04, pp. 1-14.
Chinese Third Office Action dated Jun. 5, 2009 in 200510126789.6, pp. 1-7.
European Communication dated Jul. 10, 2009 in EP 05111511.1-1527, pp. 1-5.
Proydakov, E.M., "English-Russian Explanatory Dictionary in Computing Engineering, Internet, and Programming", Moscow: publishing house "Russian edition", 2001, pp. 1-3.

Gudgin, M., "SOAP Version 1.2 Part 1: Messaging Framework", W3C Candidate Recommendation (Dec. 19, 2002), pp. 1-65.
Chinese Second Office Action dated Jun. 5, 2009 in 200480001312.9, pp. 1-9.
Chinese Third Office Action dated Jul. 17, 2009 in 200480001395.01, pp. 1-7.

* cited by examiner

METHOD, SYSTEM, AND COMPUTER-READABLE MEDIUM FOR CREATING, INSERTING, AND REUSING DOCUMENT PARTS IN AN ELECTRONIC DOCUMENT

BACKGROUND OF THE INVENTION

Modern word processors enable a user to readily create electronic documents. Many modern word processors include templates to facilitate the creation of new documents with certain styles and boilerplate text already embedded within them. Some additionally enable the insertion of "document parts" which usually represent reusable pieces of boilerplate content that may be relevant for specific types of documents. These typical elements could include such features as greeting lines for business letters, or contents appropriate for inclusion inside headers and footers, like page numbers or chapter titles, and the like. A user of a word processing application program typically selects a desired document part from a template created by a template author and then inserts the selected document part in the document. The creation and insertion of document parts in modern word processors however presents a number of opportunities for improvement for both the template author as well as the end user.

One drawback associated with the creation of document part templates for use in modern word processors is that there are certain limitations as to what can be included in the document part and what specific role it is intended to play once inserted into the document. For example, although one could make a reusable document part today that contains all the needed pieces of content that could be included in the a header, it is impossible today to easily mark that document part as a header-type, so that when the user selects it, the application would know that the part is expected to work as a header, as opposed to merely as a piece of rich text inserted at the user's insertion point. One of the benefits of the invention is that it adds additional semantics to the document part that define its role within the document, affect where and how it gets inserted when used by the user rather than just merely having it serve as a container, for boilerplate content, like typical "document-part" analogues of today do.

Another drawback of current word processor implementations is that they largely rely on template authors and users to define useful document parts and provide relevant content for them. This often requires time, effort, and skill on the part of the user or the template author to create them. The ability to have a number of useful professionally designed document parts that are provided out of the box by the application and represent specific elements of document structure that the application supports (e.g. header, footer, page number, cover page, table of contents) is another aspect of this invention intended to greatly reduce the burden on the user.

Another drawback associated with the insertion of document parts by an end user is that to achieve certain effects in the document, the end user must often perform a series of manual steps so that the document part will fit the size and layout of the document in which it is inserted as well as match the formatting of the surrounding content, if needed. For instance, to insert a cover page a user may perform one or more of the following time-consuming steps: 1. Insert a page break at the top of the document; 2. Center the test vertically in the page by using empty paragraph markers so that the title is displayed correctly; 3. Increase the font size of the title; 4. Add empty space to push text to the bottom of the page where the author's name and date will be displayed; 5. Right align the text and make it smaller.

Another drawback lies in the ability to organize the document parts and expose them in the UI in a manner that makes them easily discoverable to the user. Today, pre-defined document parts are typically available via a single generic entry point in the UI regardless of their type. This invention calls for the ability to reveal specific lists of predefined document parts in additional appropriate UI contexts, depending on their type. For example, document parts containing pre-defined tables would be exposed alongside the UI for arbitrary table insertion so that the user could make the choice between drawing a new table from scratch vs. reusing a pre-defined one from a list right there. Similarly, document parts of type "headers" would be exposed alongside the UI for editing headers in the document.

Another drawback with pre-defined document parts of today is that they do not provide a way to associate auxiliary information with them, such as informative text describing the document part or when it is supposed to be used. Without such a description, the user has to rely on the contents of the document part to guess how it's intended to be used. Part of this invention is the ability to associate arbitrary descriptions of document parts with individual document parts so that the user can understand more about the document part before inserting it into the document. The description would not be inserted into the document, only the contents of the document part would.

It is with respect to these considerations and others that the various embodiments of the present invention have been made.

BRIEF SUMMARY OF THE INVENTION

In accordance with the present invention, the above and other problems are solved by a method, system, and computer-readable medium for creating, a method for inserting and reusing document parts in an electronic document. According to one aspect of the invention, a method is provided for inserting and reusing document parts in an electronic document created within a word processing application program. The method includes receiving a selection of a document part category, displaying a gallery of document parts associated with the selected document part category, receiving a selection of a document part from the gallery, and inserting the selected document part in the electronic document. When the selected document part is inserted, its format may be matched to the format of surrounding text. The gallery of document parts defines a page layout for the electronic document. In displaying the gallery of document parts associated with the document element category, the method includes displaying a preview of each document part in the gallery and displaying a description of each document part in the gallery. The method may further include receiving user data to modify the document part and converting the user data to a preexisting format for the selected document part. The method may also include selecting a new document part from a user interface within the selected document part.

According to another aspect of the invention, a system is provided for creating document parts for defining the layout of an electronic document. The system includes a client computer operative to execute a word processing application program for consuming data. The word processing application program is further operative to generate a user interface for receiving user data to create a document part defining the layout of the electronic document, create the document part based on the received user data, and to save the created document part to a file. In creating the document part based on the received user data the word processing application program applies a user selected format to the user data, applies a description to the user data, and receives a selection of a document gallery for the user data. The word processing application program may be further operative to retrieve a previously created document part gallery, receive a selection from a gallery of previously created document parts, and to insert the selected document part from the gallery into the user created document part. The user created document part may be saved to a document part gallery in multiple formats.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
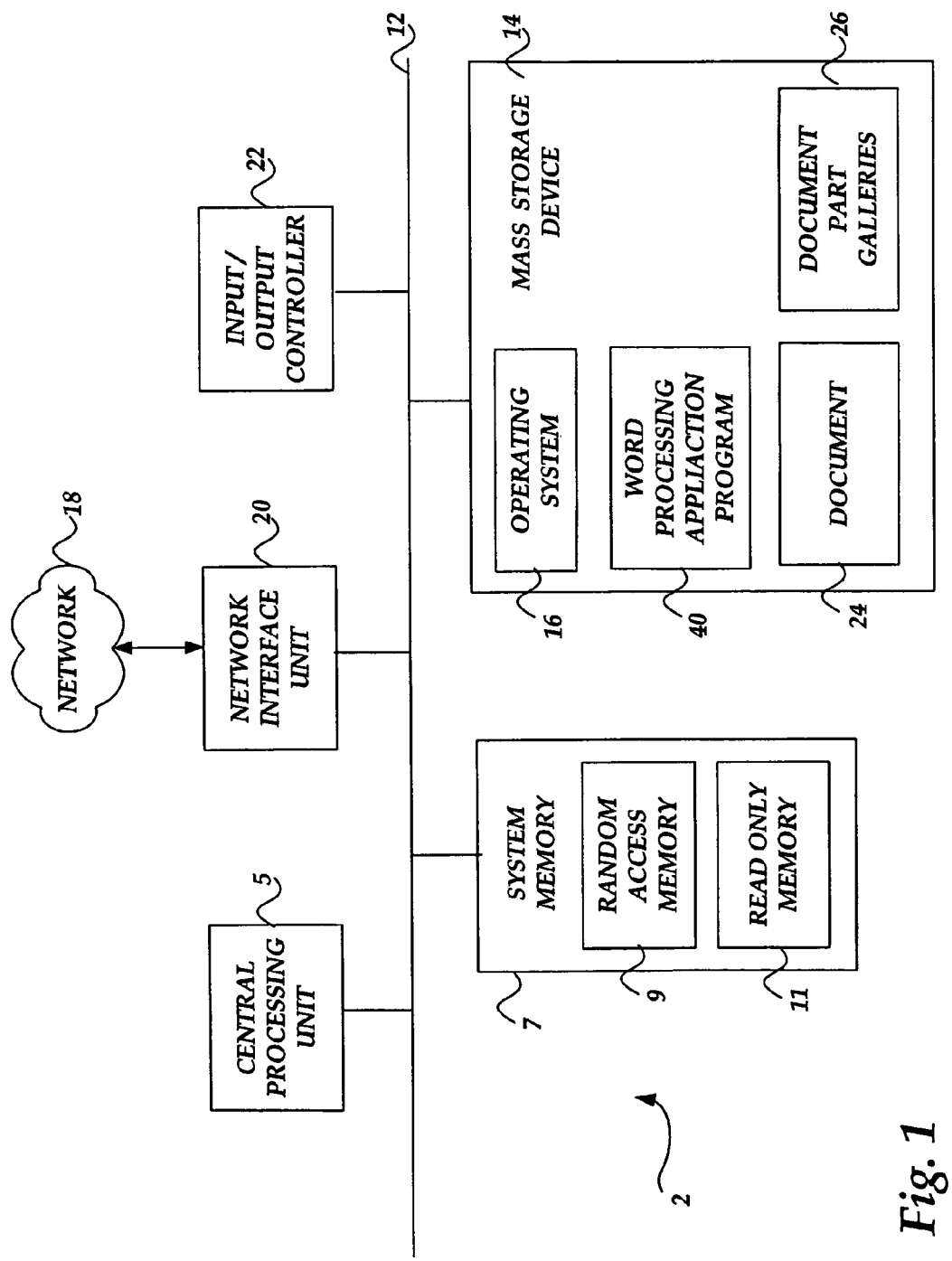
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9 ("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a word processing application program 40. As known to those skilled in the art, the word processing application program 40 is operative to provide functionality for creating and editing electronic documents, such as document 24. According to one embodiment of the invention, the word processing application program 40 comprises the WORD word processing application program from MICROSOFT CORPORATION. It should be appreciated, however, that word processing application programs from other manufacturers may be utilized to embody the various aspects of the present invention. It should further be appreciated that the various aspects of the present invention are not limited to word processing application programs but may also utilize other application programs which are capable of processing text.

In conjunction with the editing of a word processing document, the word processing application program 40 provides functionality for allowing a user to create, insert, and reuse "document parts" into various locations in the document 24. As defined herein, document parts are preformatted structural elements or layouts which add structure to documents including, but not limited to, the following categories: cover pages, mathematical equations, indexes and tables (e.g., Table of Contents, Table of Figures, and Table of Authorities), page headers and footers, pages and sections (e.g., blank pages and two-column pages), personal contact information (e.g., name and address information), images, tables, and watermarks. The document parts utilized by the word processing application program 40 may be stored as categories in document part galleries 26 which may be stored in the mass storage device 14. It will be appreciated that in addition to the categories discussed above, various embodiments of the invention may also include a "general document parts" gallery including user created document parts as well as user modified document parts representing document parts from a combination of other galleries.

It will be appreciated that the document parts discussed with respect to the various embodiments of the invention may be designed by a professional template designer or created by an end user within the word processing application program 40. It will further be appreciated that each of the document part galleries 26 may have actions associated with them for modifying, inserting, formatting, and removing document parts from a document. The document part galleries 26 and the document parts contained therein will be discussed in greater detail with respect to FIGS. 2-7, below.

Figure 2:
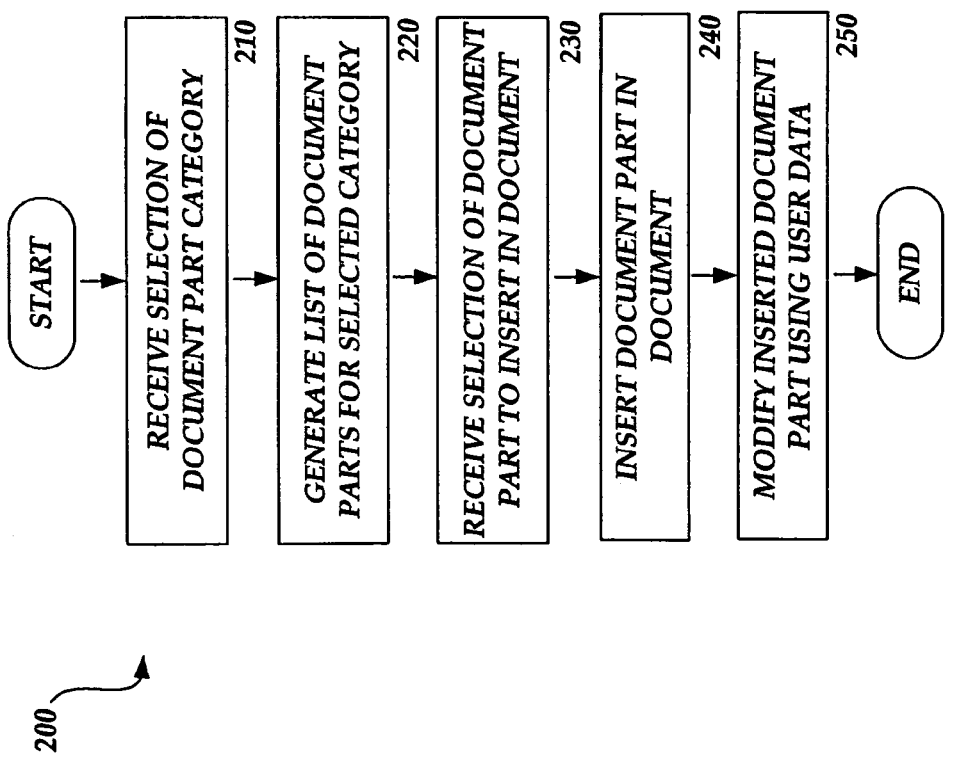
FIG. 2 is an illustrative routine performed by a word processing application program in the computer system of FIG. 1 for inserting and reusing document parts in an electronic document, according to an illustrative embodiment of the invention.

Referring now to FIG. 2, an illustrative routine 200 will be described illustrating a process performed by the word processing application program 40 for inserting and reusing document parts in an electronic document. It should be appreciated that although the embodiments of the invention described herein are presented in the context of the word processing application program 40, the invention may be utilized in other types of application programs that support text processing.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 2, the routine 200 begins at operation 210, wherein the word processing application program 40 receives a selection of a document part gallery from the document galleries 26. In particular, a user may select a document part gallery from a user interface generated by the word processing application program 40, which displays a number of document galleries for selection by the user. For instance, the word processing application program 40 may receive a selection of a cover page gallery so that a user may insert a cover page into a document.

The routine 200 continues from operation 210 to operation 220, where the word processing application program 40 generates a list of document parts for the selected document parts gallery. The routine 200 then continues to operation 230 where the word processing application program 40 receives a selection of a document part from the selected document parts gallery. In particular, a user may select a particular document part from an image gallery of displayed document parts from the user interface generated by the word processing application program 40.

The routine 200 continues from operation 230 to operation 240, where the word processing application program 40 inserts the selected document part into the document 24. In particular, the selected document part may be inserted into the document according to a predefined format. For instance, an inserted cover page document part may include centered placeholders for a user to enter a title and subtitle as well as author and date information. It will be appreciated that prior to inserting the selected document part in the electronic document, the word processing application program 40 may determine the formatting of surrounding text in an existing document and insert the selected document part to match the existing formatting.

The routine 200 then continues from operation 240 to operation 250, where the word processing application program 40 modifies the inserted document part using user data. In particular, the word processing application program 40 may receive user instructions via a menu generated in the graphical user interface to modify the formatting of a document part, reinsert the document part in another section of the document 24, remove the document part, or change the structure of the document part. The routine 200 then ends.

It will be appreciated that in changing the structure of the document part, the user may add additional data such as customized remarks or insert document parts from other document part galleries. In this manner, existing document parts may be modified and reused with other document parts. An illustrative user interface which may be utilized in the various embodiments of the invention for inserting and reusing document parts from within the word processing application program 40 will be discussed in greater detail with respect to FIGS. 3-6, below.

Figure 3:
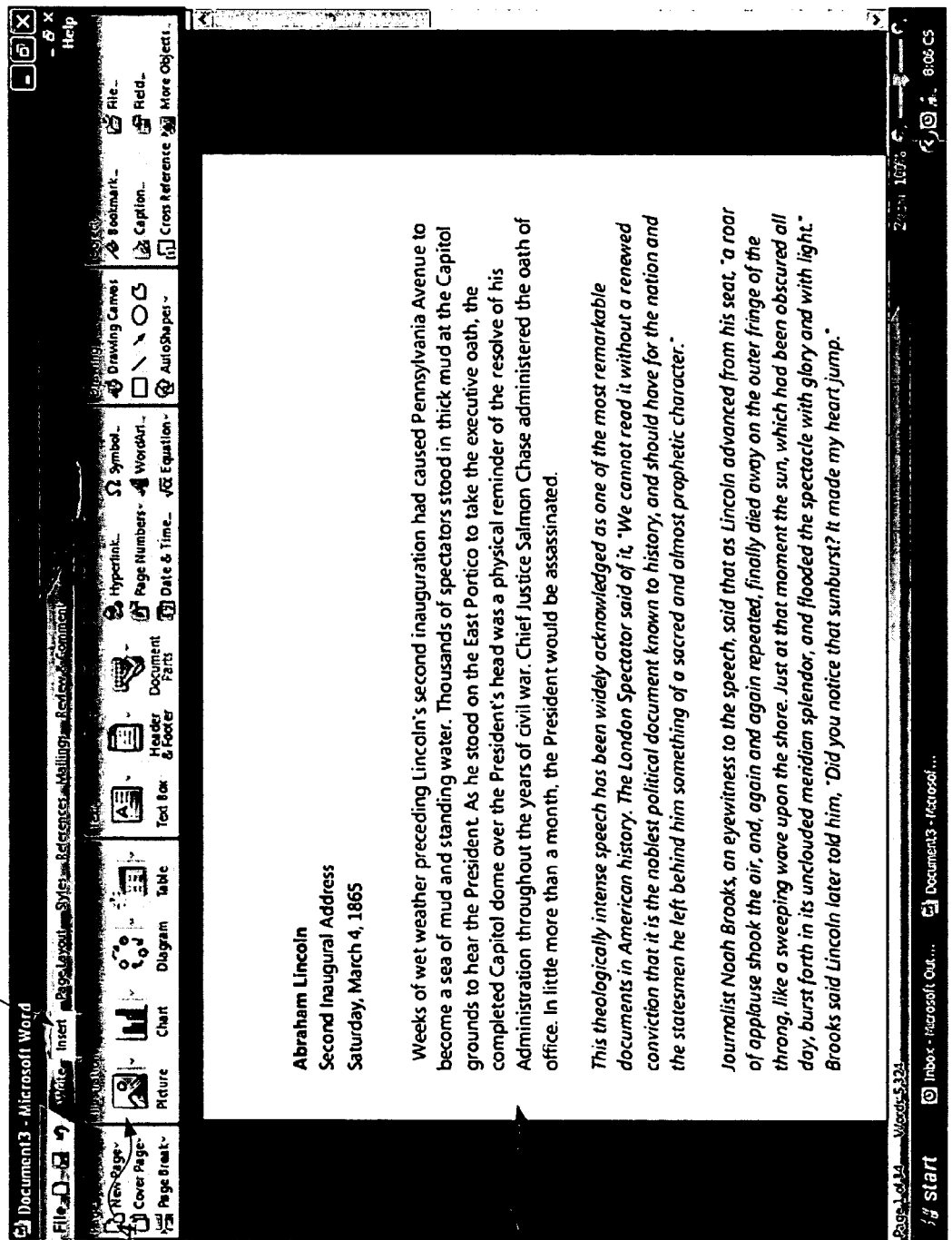
FIGS. 3-5 are screen diagrams illustrating an aspect of the invention for providing a facility through which a user may insert and reuse document parts in an electronic document, according to the various embodiments of the invention.

Referring now to FIG. 3, an illustrative user interface will be described for allowing a user to insert and reuse document parts in the document 24. FIG. 3 shows a user interface window 300 including a number of user interface components for inserting document parts. In particular, an insert button 42 is provided for selecting available document parts galleries 44 which the user interface window 300 shows as images of the various document parts which may be selected by a user. For instance, as shown in FIG. 3, document galleries for selecting Issues, Cover Pages, Headers/Footers, Watermarks, General Parts (which may include user created parts), and AutoText are displayed in the user interface window 300.

Figure 4:
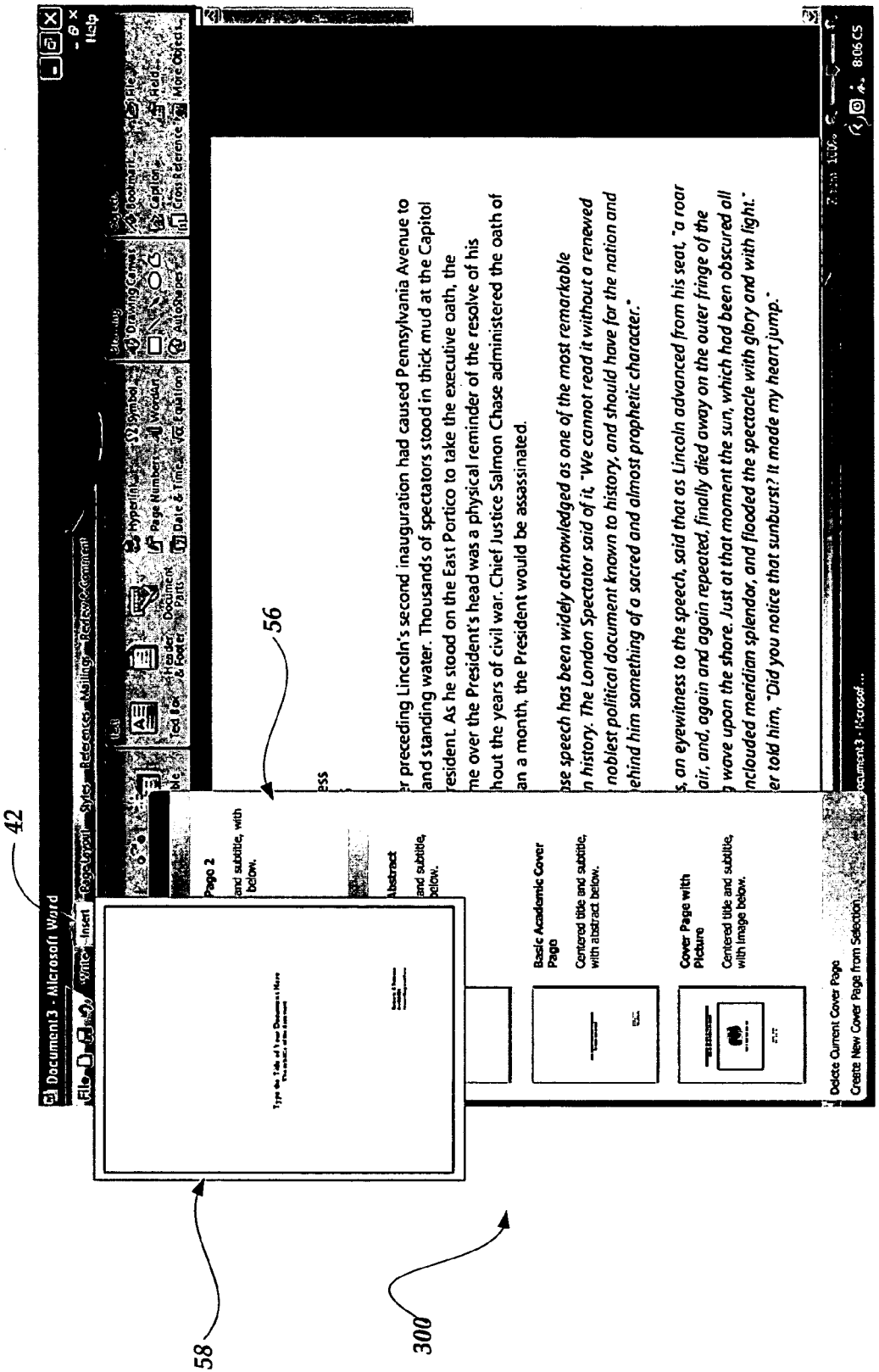

Referring now to FIG. 4, the illustrative user interface 300 is shown after a user has selected the Cover Pages document gallery. In particular, after selecting the Cover Pages gallery, a list 56 is displayed from which a user may choose to display all of the available cover pages in the gallery or recently used cover pages. As shown in FIG. 4, thumbnail images of the available cover pages in the gallery are shown along with an accompanying description of each cover page. As also shown in FIG. 4, a preview image of a selected cover page 58 is displayed with a centered title and subtitle as well as author information. It will be appreciated that in one illustrative embodiment of the invention, the author information and other information, such as the current date, may be automatically inserted in the preview image using previously stored document properties associated with the word processor application program 40.

Figure 5:
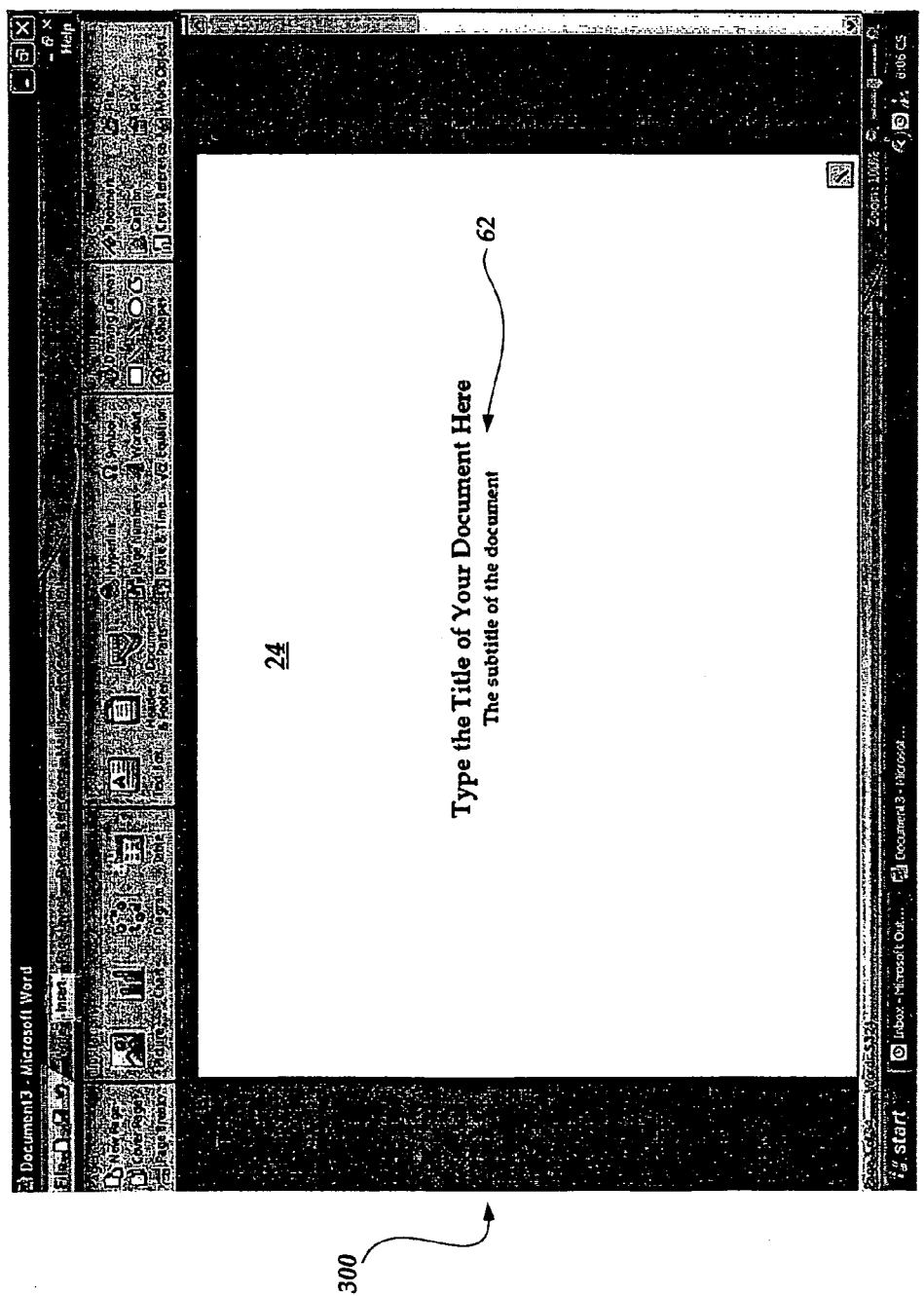

Referring now to FIG. 5, the illustrative user interface 300 is shown after a selected cover page from the Cover Page gallery is inserted into the document 24. In particular, the selected cover page includes placeholder text 62 for adding a title and subtitle of the document 24.

Figure 6:
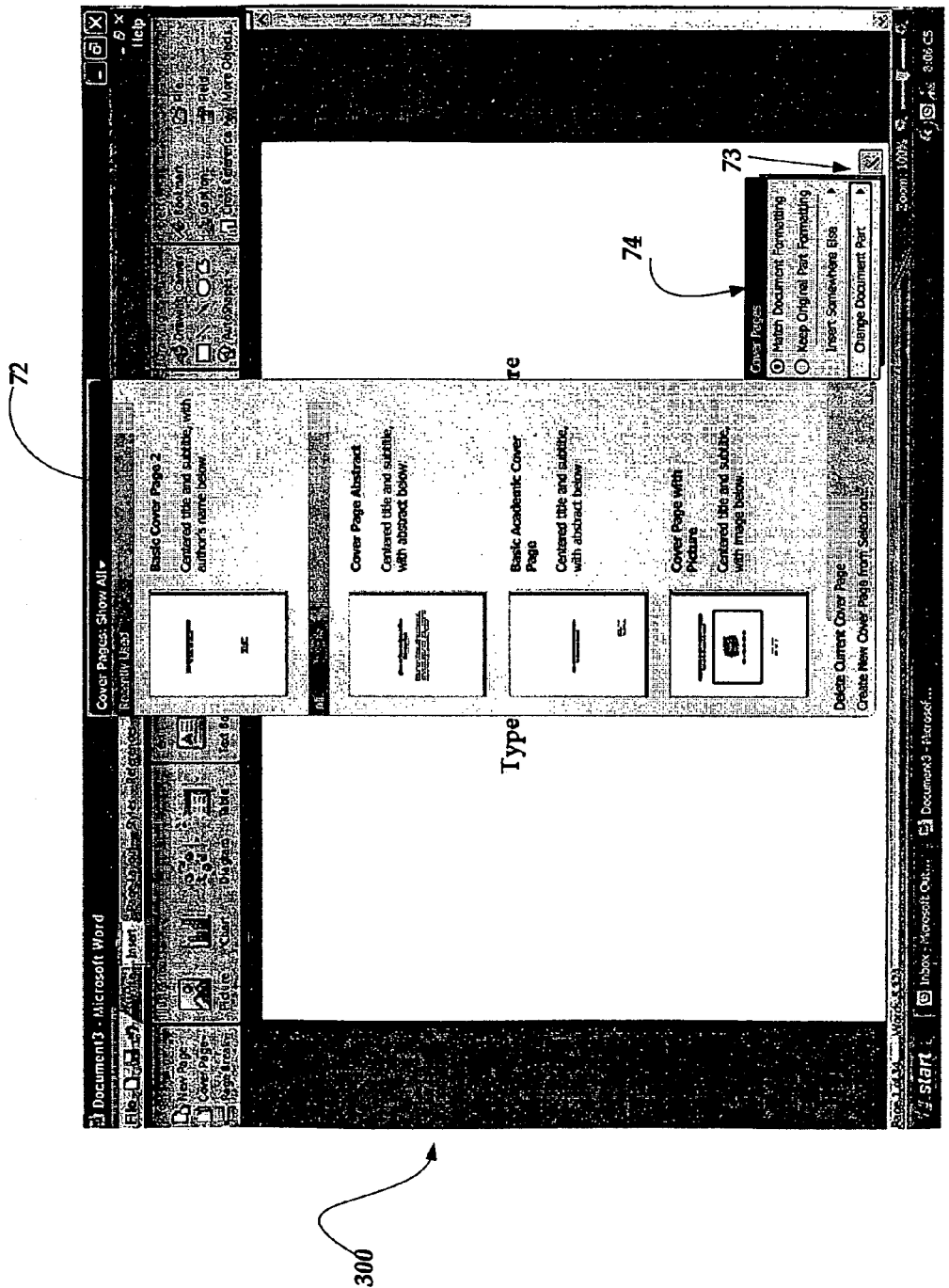
FIG. 6 is a screen diagram illustrating an aspect of the invention for providing a facility through which a user may modify an inserted document part in an electronic document, according to the various embodiments of the invention.

Referring now to FIG. 6, the illustrative user interface 300 is shown after a user has selected the on-object document part button 73 on a displayed cover page. As shown in FIG. 6, the selection of the button 73 results in a menu 74 displaying options for modifying the selected cover page. The options include matching the format of the cover page to the format of the document (i.e., "Match Document Formatting"), keeping the original (i.e., default) document part formatting, inserting the displayed document part in another location in the document, and changing (i.e., modifying the displayed document part). Selecting the cover pages option in the menu 74 generates a submenu 72 displaying thumbnails of additional cover page from the cover pages gallery as well as an option to remove the currently displayed cover page. It will be appreciated that the submenu 72 allows a user to replace a currently displayed cover page with another cover page from the cover page gallery without returning to the document parts galleries 44 (discussed previously with respect to FIG. 3). It will be appreciated that the options in the menu 74 and the submenu 72 do not only apply to cover pages but may also apply to other document parts in a document parts gallery.

Figure 7:
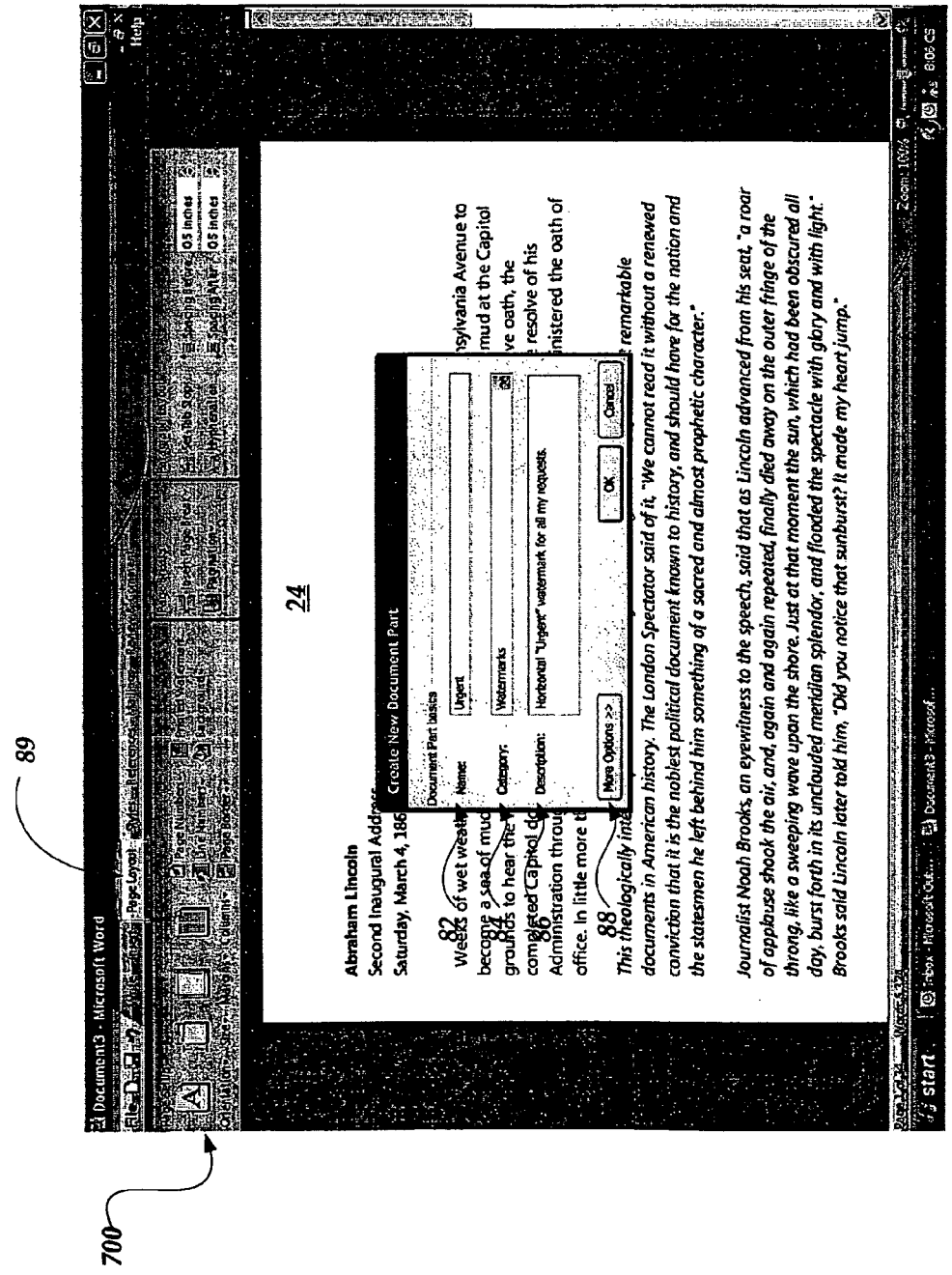
FIG. 7 is a screen diagram illustrating an aspect of the invention for providing a facility through which a user may create a document part for use in an electronic document, according to the various embodiments of the invention.

Referring now to FIG. 7, an illustrative user interface will be described for allowing a user to create document parts for insertion in the document 24. FIG. 7 shows the illustrative user interface window 700 for creating document parts. The user interface window 700 shows the "Page Layout" tab 89 for selected which displays additional options for inserting document parts (e.g., a watermark) into an existing document. In particular, the user interface window 700 allows a user to specify a Name 82, a Category 84, and a Description 86 for the document part to be created. It will be appreciated that in creating a document part, a user may specify an existing document gallery for storing the document part or, alternatively, the user may specify a General Document Parts gallery. The user interface window 700 also allows a user to specify other options via the More Options button 88 for the created document part such as specifying where the created document part may be inserted in a document.

It will be appreciated that a document part may be also be created by retrieving a previously created document part gallery, selecting a document part from the gallery, and inserting the selected document part into a previously user created document part. It will further be appreciated that in creating the document part, the user may select a default format to be applied to the document part when it is displayed in a document by the word processor application program 40. It will further be appreciated that once the document part is created via the user interface 700, it may be saved to a document part gallery in one or more document formats. In one illustrative embodiment, the created document part may be saved in multiple document formats simultaneously in a manner known to those skilled in the art. In particular, the document formats may include, but are not limited to, a word processing or text file format, hypertext markup language ("HTML"), extensible markup language ("XML"), binary, or rich text format ("RTF"). In this manner, user created document parts and document part galleries are not restricted to a single word processing application program.

Figure 8:
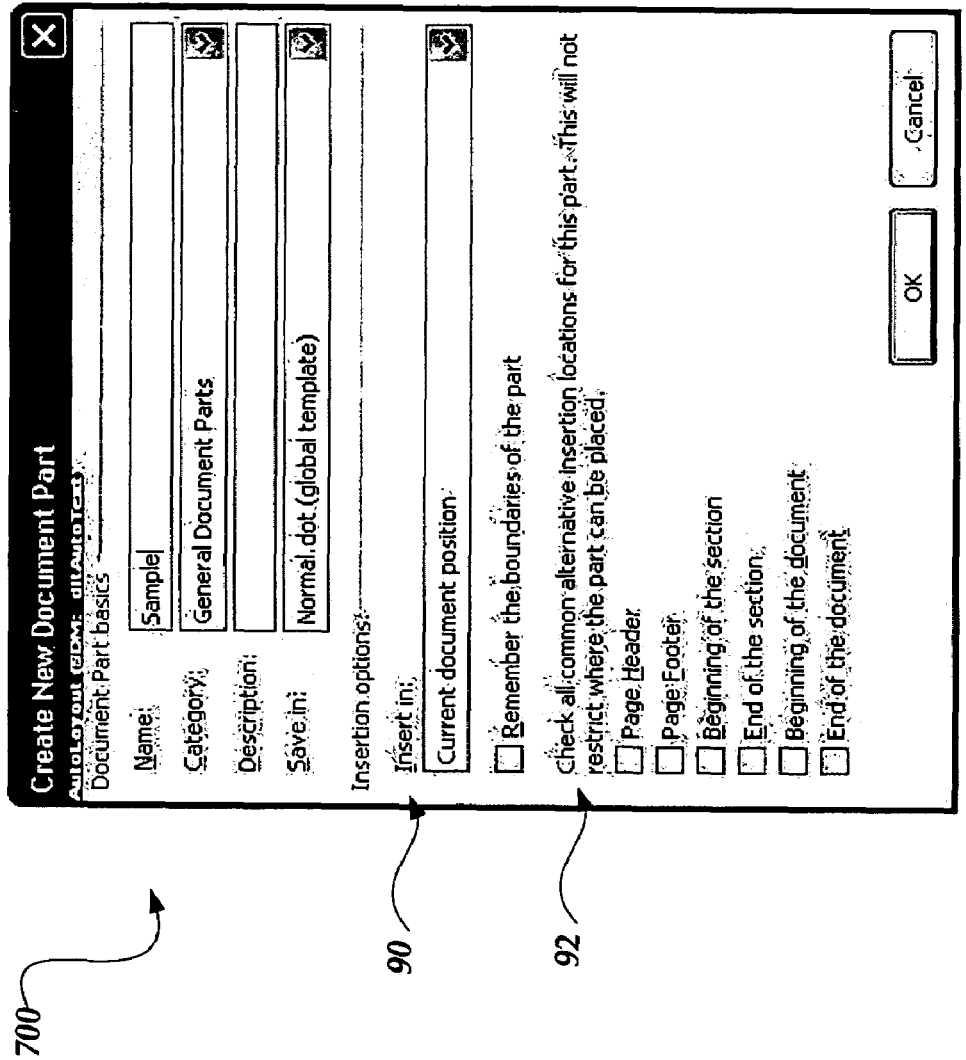
FIG. 8 is a screen diagram illustrating an aspect of the invention for providing a facility through which a user may insert a created document part for use in an electronic document, according to the various embodiments of the invention.

FIG. 8 is a screen diagram illustrating an aspect of the invention for providing a facility through which a user may insert a created document part for use in an electronic document, according to the various embodiments of the invention.

Referring now to FIG. 8, an illustrative user interface will be described for allowing a user to insert created document parts for insertion in the document 24 (shown in FIG. 7). FIG. 8 shows the illustrative user interface window 700 from FIG. 7 after the More Options button 88 has been selected. The user interface window 700 shows an "Insert in" dropdown box 90 for inserting the created document at a current document position in the document 24 (shown in FIG. 7). The user interface 700 also includes checkboxes 92 which enable a user to select alternative areas of the document for inserting created document parts. In particular, created document parts may be inserted in a page header, page footer, the beginning of a section, the end of a section, the beginning of the document, or the end of the document.

Based on the foregoing, it should be appreciated that the various embodiments of the invention include a method and apparatus and computer-readable medium for managing specific types of content in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for inserting and reusing document parts in an electronic document created within a word processing application program, comprising:

receiving a selection of a document part category;

displaying a gallery of document parts associated with the selected document part category, wherein the document parts include reusable portions of document content;

receiving a selection of a document part from the gallery, wherein the document part includes a role identifier that indicates a role of the document part within the electronic document;

identifying the role indicated by the role identifier;

inserting the selected document part in the electronic document in accordance with the identified role;

receiving user data; and modifying the selected part with the received user data, wherein modifying the selected document part with the received user data comprises adding additional data to the selected document part, the additional data comprising at least one document part from one or more alternative galleries of document parts and selecting an option from a menu comprising a plurality of options for modifying the selected document part, wherein selecting the option from the menu for modifying the selected document part comprises generating a submenu displaying thumbnails of additional document parts from the gallery and an option for removing a currently displayed document part, and wherein the submenu is utilized to replace a currently displayed document part with one of the additional document parts from the gallery without returning to the gallery.

2. The method of claim 1, wherein modifying the selected document part with the received user data further comprises converting the user data to a preexisting format for the selected document part.

3. The method of claim 1 further comprising selecting a new document part from a user interface within the selected document part.

4. The method of claim 1, wherein displaying a gallery of document parts associated with the document element category comprises:

displaying a preview of each document part in the gallery; and displaying a description of each document part in the gallery.

5. The method of claim 1, wherein the gallery of document parts defines a page layout for the electronic document.

6. The method of claim 1, wherein inserting the selected document part in the electronic document further comprises inserting the selected document part such that the document part matches a preexisting format of surrounding text.

7. A system for inserting and reusing document parts in an electronic document, comprising a client computer operative to execute an application program for consuming data, the application program further operative to receive a selection of a document part category, display a gallery of document parts associated with the selected document part category, wherein the document parts include reusable portions of document content, receive a selection of a document part from the gallery, wherein the document part includes a role identifier that indicates a role of the document part within the electronic document, identify the role indicated by the role identifier, to insert the selected document part in the electronic document in accordance with the identified role, to receive user data, and to modify the selected part with the received user data, wherein modifying the selected document part with the received user data comprises adding additional data to the selected document part, the additional data comprising at least one document part from one or more alternative galleries of document parts and selecting an option from a menu comprising a plurality of options for modifying the selected document part, wherein selecting the option from the menu for modifying the selected document part comprises generating a submenu displaying thumbnails of additional document parts from the gallery and an option for removing a currently displayed document part, and wherein the submenu is utilized to replace a currently displayed document part with one of the additional document parts from the gallery without returning to the gallery.

8. The system of claim 7, wherein modifying the selected document part with the received user data further comprises converting the user data to a preexisting format for the selected document part.

9. The system of claim 7, wherein the application program is further operative to select a new document part from a user interface within the selected document part.

10. The system of claim 7, wherein displaying a gallery of document parts associated with the document element category comprises:

displaying a preview of each document part in the gallery; and displaying a description of each document part in the gallery.

11. The system of claim 7, wherein the gallery of document parts defines a page layout for the electronic document.

12. The system of claim 7, wherein inserting the selected document part in the electronic document further comprises inserting the selected document part such that the document part matches a preexisting format of surrounding text.

13. A system for creating document parts for defining the layout of an electronic document, comprising a client computer operative to execute an application program for consuming data, the application program further operative to generate a user interface for receiving user data, the user data utilized to create a document part defining the layout of the electronic document, wherein the user data is further utilized to modify the document part, wherein modifying the document part comprises adding additional data to the document part, the additional data comprising at least one document part from one or more alternative galleries of document parts, and selecting an option from a menu comprising a plurality of options for modifying the selected document part, wherein selecting the option from the menu for modifying the selected document part comprises generating a submenu displaying thumbnails of additional document parts from the gallery and an option for removing a currently displayed document part, and wherein the submenu is utilized to replace a currently displayed document part with one of the additional document parts from the gallery without returning to the gallery, wherein the document part includes reusable portions of document content, wherein the user interface includes insertion options for indicating a role for the document part within the electronic document, create the document part based on the received user data and the indicated role, and to save the created document part, wherein the user created document part is saved to the document part gallery simultaneously in a plurality of data formats, the plurality of data formats including at least two of a word processing format, a hypertext markup language format, an extensible markup language format, a binary format, and a rich text format.

14. The system of claim 13, wherein the application program is further operative to retrieve a previously created document part gallery, receive a selection from a gallery of previously created document parts, identify the role indicated by the role identifier, and to insert the document part from the gallery into the user created document part in accordance with the identified role.

15. The system of claim 13, wherein creating the document part based on the received user data comprises applying a user selected format to the user data, applying a description to the user data, and receiving a selection of a document gallery for the user data.

16. A computer-readable storage medium having computer-executable instructions stored thereon which, when executed by a computer, will cause the computer to perform a method for inserting and reusing document parts in an electronic document created within a word processing application program, the method comprising:

receiving a selection of a document part category;

displaying a gallery of document parts associated with the selected document part category, wherein displaying a gallery of document parts associated with the selected document part category comprises displaying a preview of each document part in the gallery and displaying a description of each document part in the gallery, wherein the document parts include reusable portions of document content;

receiving a selection of a document part from the gallery, wherein the document part includes a role identifier that indicates a role of the document part within the electronic document;

automatically inserting at least one of author information and current date information in the displayed preview using previously stored document properties associated with the word processing application program;

identifying the role indicated by the role identifier;

inserting the selected document part in the electronic document in accordance with the identified role;

receiving user data; and modifying the selected document part with the received user data, wherein modifying the selected document part with the received user data comprises adding additional data to the selected document part, the additional data comprising at least one document part from one or more alternative galleries of document parts and selecting an option from a menu comprising a plurality of options for modifying the selected document part, wherein selecting the option from the menu for modifying the selected document part comprises generating a submenu displaying thumbnails of additional document parts from the gallery and an option for removing a currently displayed document part, and wherein the submenu is utilized to replace a currently displayed document part with one of the additional document parts from the gallery without returning to the gallery, and wherein the selected document part defines a page layout for the electronic document.

17. The computer-readable storage medium of claim 16, wherein modifying the selected document part with the received user data comprises converting the user data to a preexisting format for the selected document part.

18. The computer-readable storage medium of claim 16 further comprising selecting a new document part from a user interface within the selected document part.

19. The computer-readable storage medium of claim 16, wherein inserting the selected document part in the electronic document further comprises inserting the selected document part such that the document part matches a preexisting format of surrounding text.

\* \* \* \* \*